(12) United States Patent
Bui

(10) Patent No.: US 10,451,887 B2
(45) Date of Patent: Oct. 22, 2019

(54) STEREOSCOPIC DISPLAYS, ARRANGEMENTS AND METHODS

(71) Applicant: Dac Thong Bui, Glenroy (AU)

(72) Inventor: Dac Thong Bui, Glenroy (AU)

( * ) Notice: Subject to any disclaimer, the term of this patent is extended or adjusted under 35 U.S.C. 154(b) by 0 days.

(21) Appl. No.: 15/671,973

(22) Filed: Aug. 8, 2017

(65) Prior Publication Data

US 2018/0003995 A1 Jan. 4, 2018

Related U.S. Application Data

(62) Division of application No. 14/815,997, filed on Aug. 1, 2015, now Pat. No. 9,759,926.

(51) Int. Cl.
*G02B 27/22* (2018.01)
*G03B 21/625* (2014.01)
*H04N 13/305* (2018.01)
*H04N 13/32* (2018.01)

(52) U.S. Cl.
CPC ....... *G02B 27/2214* (2013.01); *G03B 21/625* (2013.01); *H04N 13/305* (2018.05); *H04N 13/32* (2018.05)

(58) Field of Classification Search
CPC . G02B 27/0172; G02B 27/2214; H04N 13/31

USPC ....... 359/463, 464, 630, 462; 348/56, 59, 51
See application file for complete search history.

(56) References Cited

U.S. PATENT DOCUMENTS

| | | | |
|---|---|---|---|
| 3,960,563 A | 6/1976 | Lo | |
| 5,754,344 A * | 5/1998 | Fujiyama | G02B 27/0172 359/631 |
| 6,859,240 B1 * | 2/2005 | Brown | G02B 27/2214 349/15 |
| 7,719,767 B2 | 5/2010 | Lin | |
| 9,217,875 B1 | 12/2015 | Huang | |
| 2005/0073577 A1 * | 4/2005 | Sudo | H04N 13/31 348/51 |
| 2009/0195873 A1 | 8/2009 | Kubara | |

* cited by examiner

*Primary Examiner* — Audrey Y Chang

(57) ABSTRACT

In one preferred form illustrated in FIG. 1 there is provided an autostereoscopic display 10. The display 10 includes a layer 20 of pixel sources 22. The display includes a source screen 12 and a lens structure 14. The source screen 12 is able to separate light from each pixel source 22, in the layer 20 of pixel sources 22, into view position input sources 32 each corresponding with a different view position 40. The lens structure 14 has a view position configuration 36 and a views configuration 38. The view position configuration 36 and the views configuration 38 of the lens structure 14 are able to transmit light, that is received from the view position input sources 32 as corresponding lens structure inputs 34, as views 39 grouped in viewing positions 40.

20 Claims, 14 Drawing Sheets

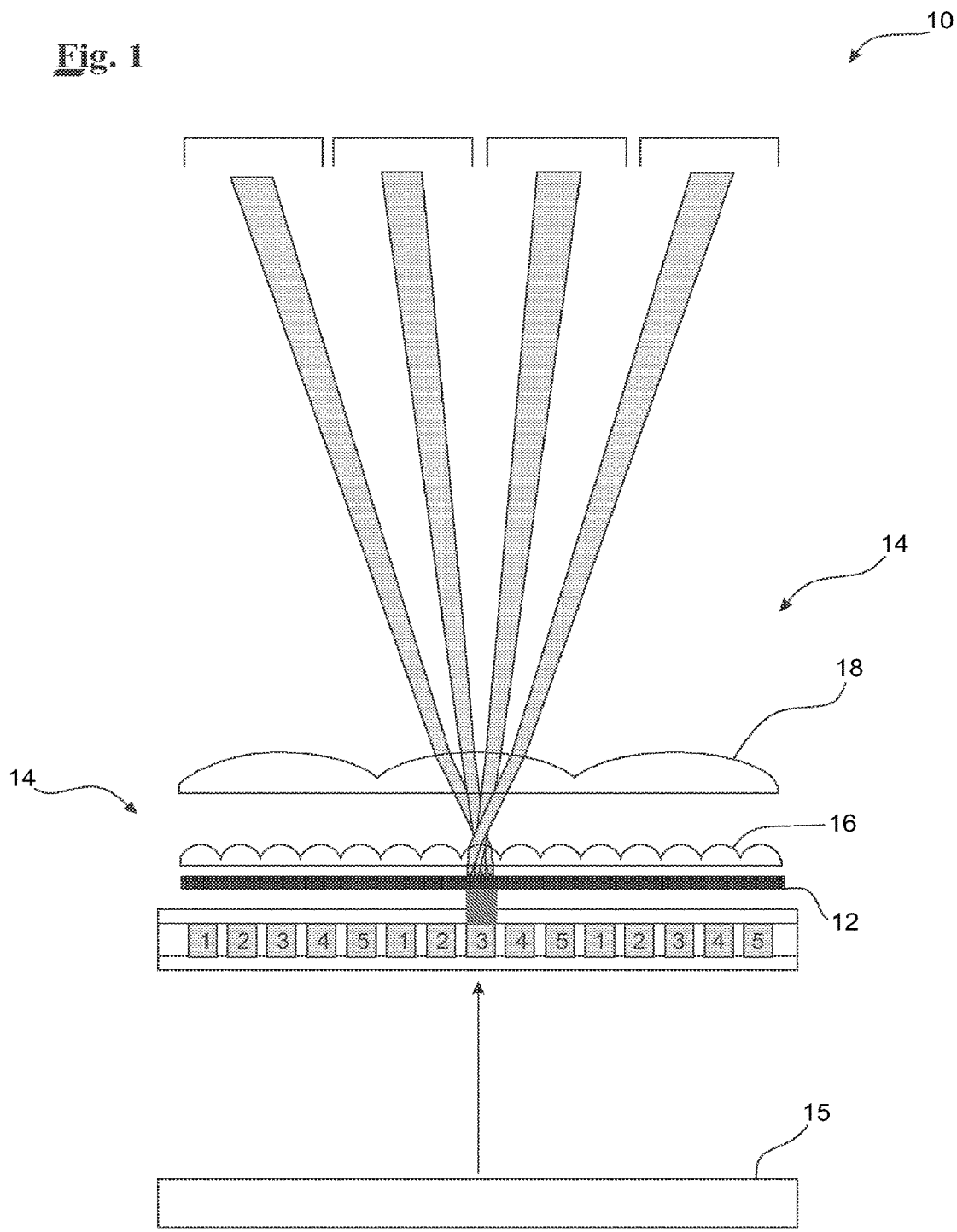

BACKGROUND

BACKGROUND

BACKGROUND

BACKGROUND

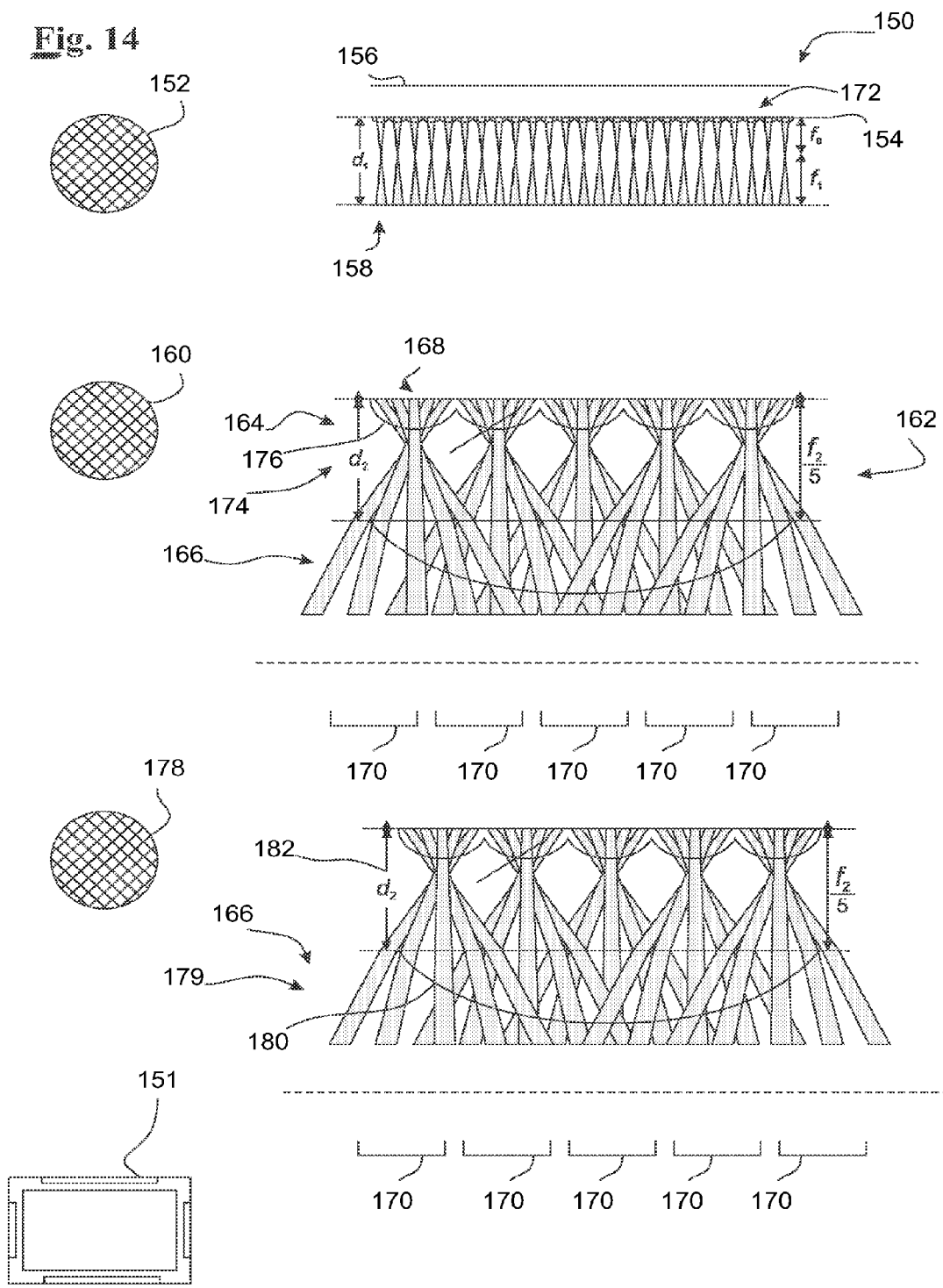

STEREOSCOPIC DISPLAYS, ARRANGEMENTS AND METHODS

FIELD OF THE INVENTION

The present invention relates to stereoscopic displays, arrangements and methods.

BACKGROUND TO THE INVENTION

Current auto stereoscopic displays suffer from a number of advantages and disadvantages. These advantages and disadvantages include those relating to flexibility, resolution, manufacturing and use.

It would be advantageous to provide an improved stereoscopic display or at least provide the public with a useful choice.

SUMMARY OF THE INVENTION

According to a first aspect of preferred embodiments herein described there is provided a lens arrangement for a layer of pixel sources in an autostereoscopic display, the lens arrangement comprising: a source screen and a lens structure; the source screen able to separate light from each pixel source, in the layer of pixel sources, into view position input sources each corresponding to a different view position; the lens structure having a view position configuration and a views configuration; the view position configuration and the views configuration of the lens structure being able to transmit light, that is received from the view position input sources as corresponding lens structure inputs, as views grouped in viewing positions.

Preferably the source screen separates the light from each pixel source into separate lens structure inputs for providing the views grouped in viewing positions.

Preferably the source screen comprises an aperture barrier having a number of slits.

Preferably the source screen comprises a series of convex portions facing away from the pixel layer.

Preferably a number N, more than 2, convex portions span each pixel to provide the lens arrangement with N viewing positions.

Preferably the lens structure includes a view position screen and a views screen; the view position screen for providing diverging light corresponding with the view positions to the views screen, the views screen for using the received light to generate views at each view position.

Preferably the distance between the view position screen and the views screen is able to be varied to match parameters for required viewing angles, the width of the viewing zone or the viewing distance.

Preferably the distance between the view position screen and the views screen is less than 1 times the focal length of the views screen Preferably the distance between the view position screen and the views screen is approximately ⅕ the focal length of the views screen.

Preferably the view position screen comprises a series of convex portions facing away from the pixel layer, the convex portions for providing the view position configuration.

Preferably each convex portion of the view position screen spans a single pixel source to receive light from the view position input sources as the corresponding lens structure inputs.

Preferably the views screen comprises a series of convex portions facing away from the pixel layer, the series of convex portions for providing the views configuration.

Preferably the view position screen and the views screen each include a planar surface facing the pixel layer.

According to a second aspect of preferred embodiments herein described there is provided a method of providing autostereoscopic images, the method comprising: using a source screen to separate light from a number of pixel sources into view position input sources each corresponding with a different view position; transmitting the separated light to a lens structure having a view position configuration and a views configuration; the view position configuration and the views configuration of the lens structure transmitting the light, that is received from the view position input sources as corresponding lens structure inputs, as views grouped in viewing positions.

Preferably using a source screen to separate the light from the pixel sources includes using an aperture barrier having a number of slits.

Preferably using a source screen to separate the light from the pixel sources includes using a series of convex portions facing away from the pixel layer.

Preferably a number N, more than 2, convex portions span each pixel source to provide the lens arrangement with N viewing positions.

Preferably the method includes using a view position screen comprising a series of convex portions facing away from the pixel layer to provide the view position configuration Preferably the method includes using a views screen comprising a series of convex portions facing away from the pixel layer to provide the view configuration.

Preferably the method includes using a view position screen to provide the view position configuration; using a views screen to provide the views configuration; and controlling the distance between the view position screen and the views screen to match parameters for desired viewing angles, the width of the viewing zone or the viewing distance.

Preferably the distance between the view position screen and the views screen is less than 1 times the focal length of the views screen.

Preferably the distance between the view position screen and the views screen is approximately 0.15 to 0.25 times the focal length of the views screen.

Preferably the distance between the view position screen and the views screen is approximately 0.2 the focal length of the views screen.

As will be discussed embodiments of the present invention are considered to provide number of preferred arrangements including:

(i) The provision of aperture slit and lenticular technology systems that provide a wide viewing angle for the display, a large number of viewing positions and which have a resolution largely independent of the number of viewing positions.

(ii) The provisions of lenticular technology systems having plano-convex lenticel sections that are readily fabricated using current technologies.

(iii) The provision of lenticular technology systems having piano-convex lenticel sections allowing for the formation of individual view position input sources from a light source (such as an led) where each view position input source corresponds with a different view position without substantial losses from the light source.

It is to be recognised that other aspects, preferred forms and advantages of the present invention will be apparent from the present specification including the detailed description, drawings and claims.

BRIEF DESCRIPTION OF DRAWINGS

In order to facilitate a better understanding of the present invention, several preferred embodiments will now be described with reference to the accompanying drawings, in which:

FIG. 1 provides a schematic view of an auto stereoscopic display according to a first preferred embodiment of the present invention.

FIG. 14 provides a schematic view of a method according to a third preferred embodiment of the present invention.

DETAILED DESCRIPTION OF THE EMBODIMENTS

Figure 2A:
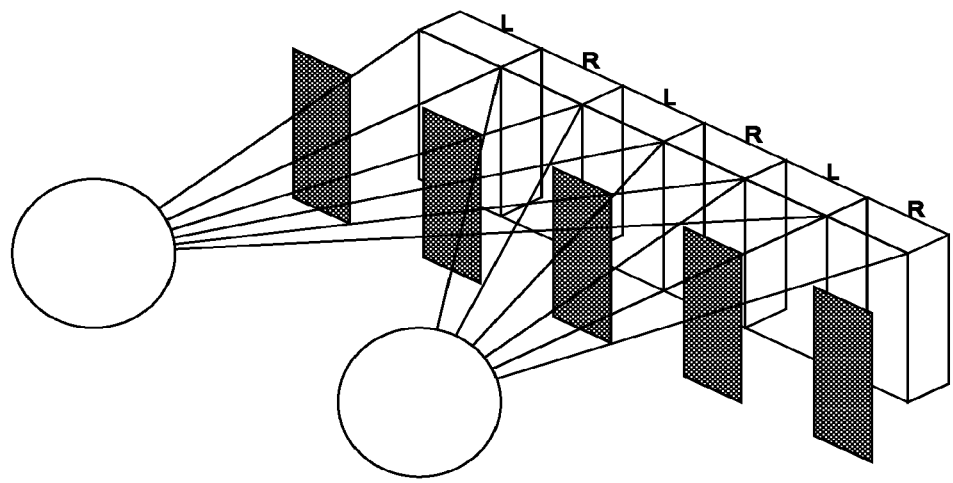
FIG. 2a provides a schematic view of a conventional parallax auto stereoscopic display for the purpose of describing the display shown in FIG. 1.

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.]

Referring to FIG. 1 there is shown an auto stereoscopic display 10 according to a first preferred embodiment of the present invention. The auto stereoscopic display 10 includes a source screen 12 and a lens structure 14. The lens structure 14 includes a view position screen 16 and views screen 18.

Commercial auto-stereoscopy displays generally comprise either parallax barrier or lenticular screen technology. The display 10 is considered to provide an advantageous lenticular screen technology.

It is to be appreciated that the term lenticular is used in the conventional sense. As would be apparent, the reader is to use appropriate judgement when terms are used in particular contexts in the overall context of the specification as a whole.

In this embodiment, the display 10 is considered to provide a display apparatus with a significant number of views for a significant number of viewers with, possibly, only a slight loss of resolution. Only a slight loss of resolution occurs because the resolution of the display 10 is dependent only on the number of viewing windows within each viewing position but not on the number of viewers or the number of viewing positions.

Figure 2B:
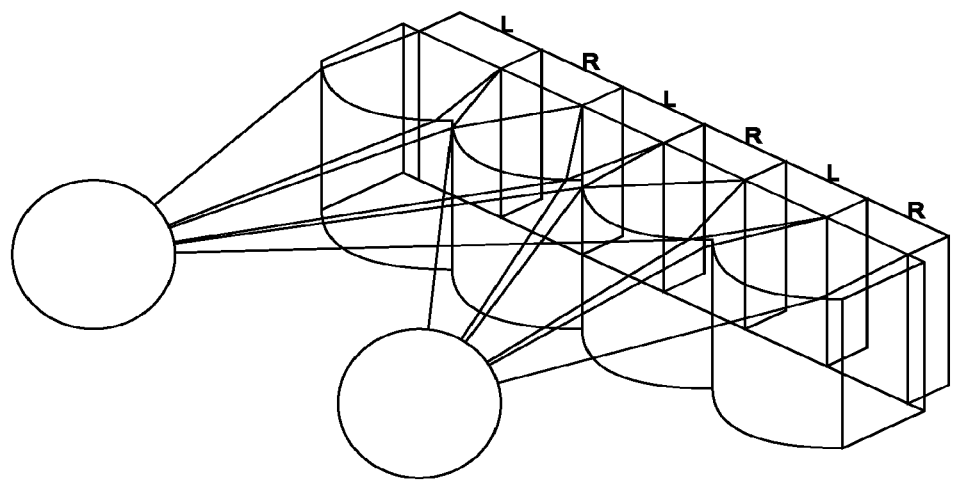
FIG. 2b provides a schematic view of a conventional lenticular auto stereoscopic display for the purpose of describing the display shown in FIG. 1.

Before describing the structure and operation of the display 10 in detail, it is useful to consider the resolution of parallax and lenticular technologies. Referring to FIGS. 2a and 2b there is respectively shown a parallax barrier auto-stereoscopic display ('the parallax system') and a lenticular auto-stereoscopic display ('the lenticular system'). The parallax barrier system shown in FIG. 2a provides a viewing shield for the eyes of a person, so as to shield the left and right eyes of a person. The lenticular system shown in FIG. 2b comprises a directional element in the form of a lenticular lens having a number convex lenticular segments that project from a base.

Conventional parallax systems and lenticular systems generally suffer from low resolution for multiple viewers. Resolution is related to both the number of viewing windows seen by each viewer and the number of viewers. A general relationship can be stated as:

$$\text{Resolution} \propto \frac{1}{n}$$

where
n=the number of views seen by each viewer (or the number of viewing windows) per viewing position.
N=the number of viewing positions (or the number of viewers).

Figure 3:
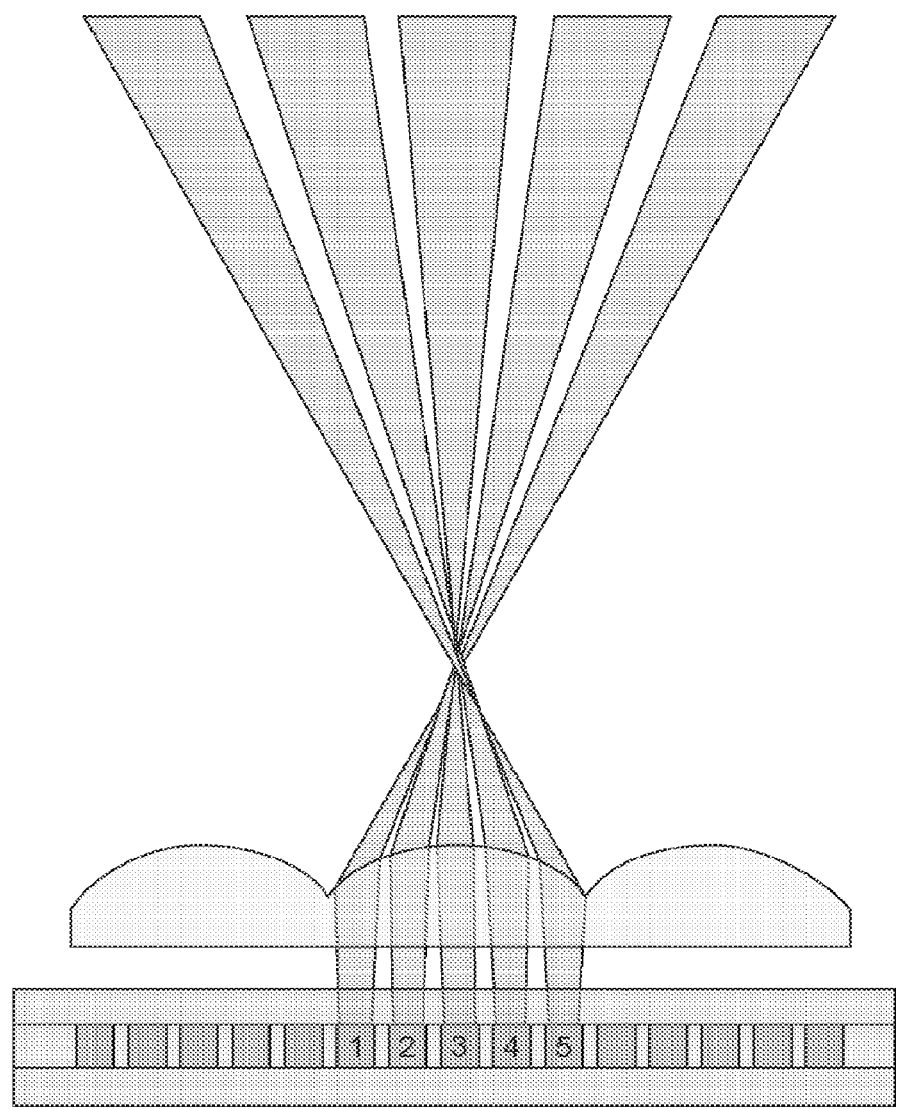
FIG. 3 provides a schematic view of a conventional multi view single position lenticular system display for the purpose of describing the display shown in FIG. 1.

Such a relationship assumes and results from each screen pixel in both the lenticular system and the parallax system being used in one view. FIG. 3 provides an example of a lenticular system where each pixel is used in a single view (multi views—1 viewing position). Such a system provides a single viewing position with n views corresponding with the number of pixels sources per lenticular convex section. A time-multiplexed parallax barrier system allows a pixel source to produce 2 or more views at a lower refreshing rate per view. This however requires time multiplexing.

Usually an nN value is roughly between 9 to 15. A value greater than 15 provides a higher auto-stereoscopic freedom but is generally associated with an unacceptably low resolution. An nN value below 9 will provide a higher resolution but is generally associated with low number of views that can cause poor auto-stereoscopy or un-natural restriction on the viewer's movement. Consequently, displays with an nN value below 9 are often designed to be viewed by a single viewer (at a single viewing position).

A single viewer display may be suitable for solitary gaming activities but is often not suited to other situations such as a home theatre environment. Home theatre environments generally involve more than one viewer and require multiple viewing positions. The applicant considers that this is likely to be the reason why conventional auto-stereoscopic displays have not been popular with general consumers.

As noted above, the display 10 is considered to provide an improved apparatus with a significant number of views for a significant number of viewers with only a relatively slight loss of resolution.

It is considered that the resolution of the display 10 is independent of N term (the number of viewers).

Figure 4:
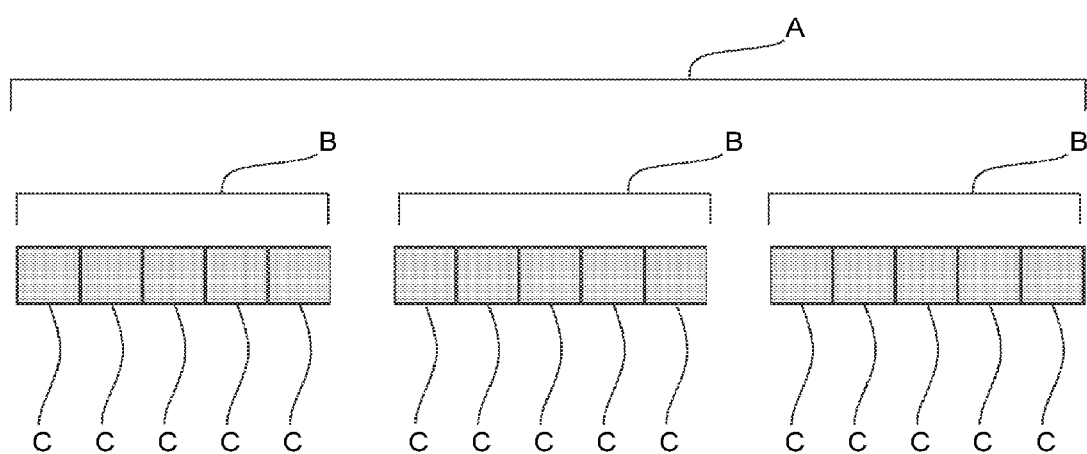
FIG. 4 provides an illustrative view of various auto stereoscopic terms.

Notably, the terms 'viewing zone', 'viewing position' and 'viewing window" generally have the following auto stereoscopic meanings. The reader is however to use appropriate judgement when the terms are used in particular contexts. FIG. 4 provides an illustration of these terms Viewing zone (A): the plane at which the observer can best see the stereoscopic images.

Viewing position (B): the position within the viewing zone at which the observer is intended to view the stereoscopic image.

Viewing window (C): the small proportion of space within the viewing position at which each eye can see a complete monocular image. The image in each viewing window being slightly different from the images in the neighbouring windows within the viewing position.

Figure 5:
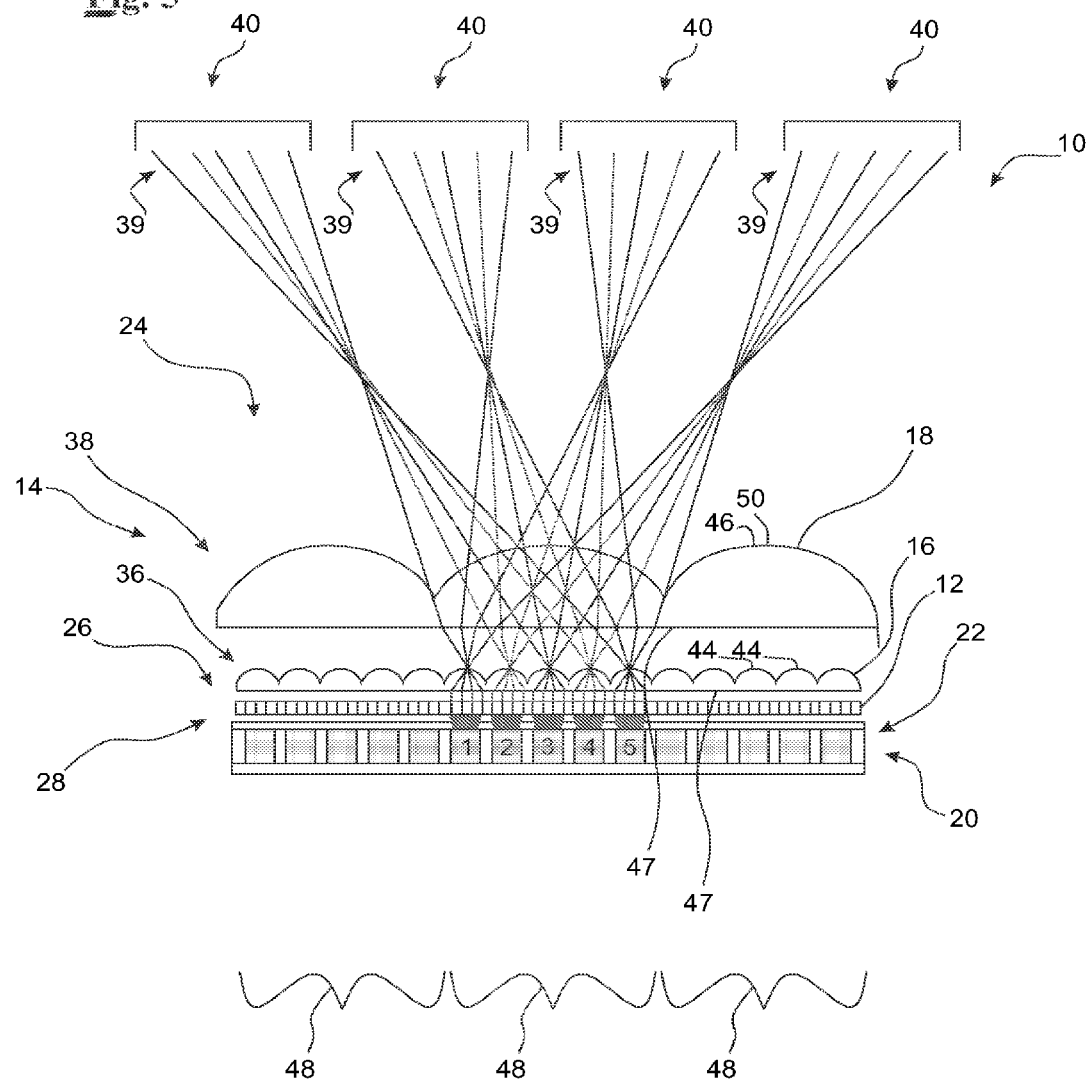
FIG. 5 provides a further schematic view of the display shown in FIG. 1.

FIG. 5 further illustrates the display 10 according to the first preferred embodiment. The display 10 includes a layer 20 of pixels sources 22. The source screen 12 is positioned in front of the layer 20. The view position screen 16 is positioned in front of the source screen 12. The views screen 18 is located in front of the view position screen 16.

The layer 20 of pixel sources 22 is provided by a back light unit 15. See FIG. 1. The display 10 can be considered as providing a spatial light modulator 24 comprising: a pixel layer 20, the source screen 12, the viewing position screen 16 and the views screen 18.

In the embodiment the source screen 12 is provided as an aperture barrier 26 having a series of small narrow slits 28. The view position screen 16 and the views screen 18, in the lens structure 14, each comprise a lenticular screen. The arrangement is considered to provide an advantageous spatial light modulator providing an embodiment of the present invention in its own right. The spatial light modulator 24 comprises: the pixel layer 20, the aperture barrier 26, the first lenticular screen 16 and finally the second lenticular screen 18.

The display 10 is illuminated by a back light source to transmit light through the aperture barrier 26 and the two lenticular screen 16, 18. Light passing through the pixel layer 20 is be met by the aperture barrier 26. The aperture barrier 26 is placed at the focal length of the first lenticular screen 16 to provide well directed light.

Figure 6:
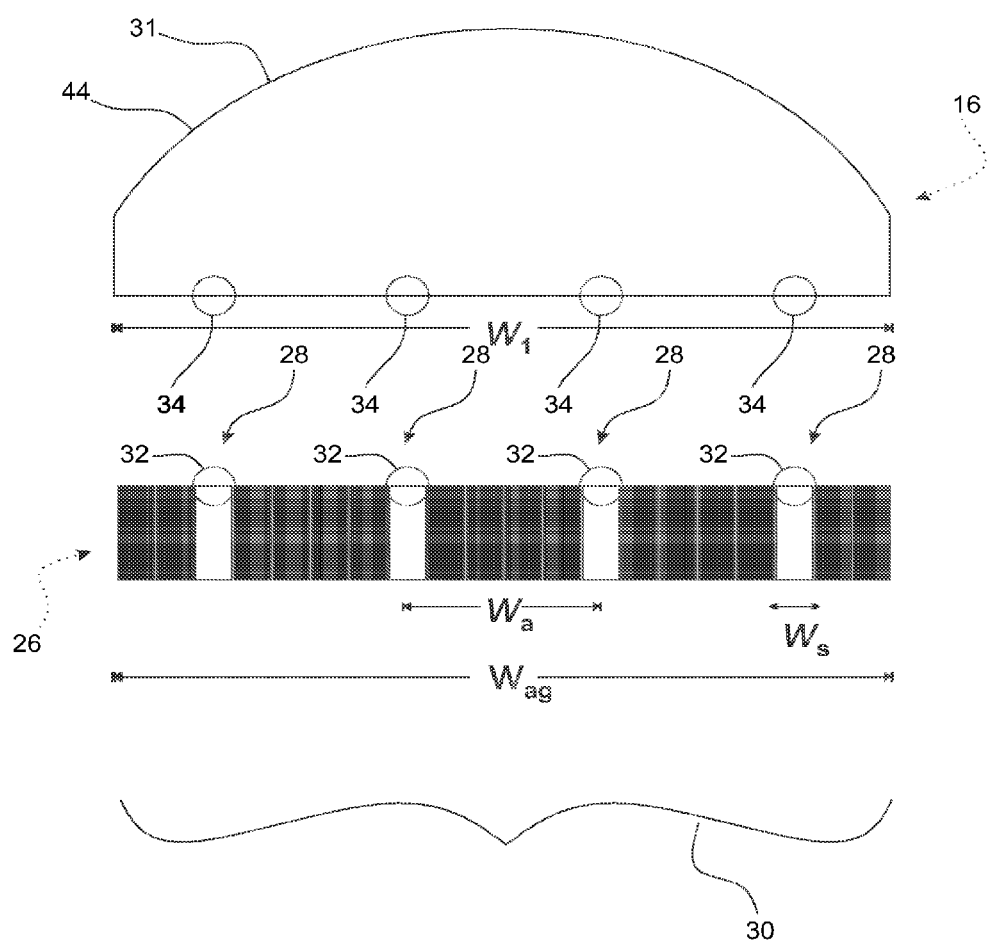
FIG. 6 provides an enlarged illustrative view of a segment of an aperture barrier and lenticular convex element of the display shown in FIG. 1.

As shown in FIG. 6, the slits 28 of the aperture barrier 26 form parallel passages extending vertically across the aperture barrier 26. Returning to FIG. 5, the slits 28 are arranged above corresponding pixel sources 22. Each slit 28 is illuminated by a single pixel source 22 and forms part of an aperture grouping 30 (See FIG. 6) below a corresponding convex segment 31 of the view position screen 16. The aperture groupings and convex segments are arranged in series to provide the aperture barrier 26 and the view position screen 16.

Light from each pixel source 22 which has passed through the slits of the corresponding aperture group of the aperture barrier 26 is be collected, collimated and redirected by the first lenticular 16 screen towards the corresponding viewing positions.

Notably, in the present embodiment, the aperture barrier 26 is used to generate multiple point like light sources from each single pixel source provided by the layer 20. The provision of point like sources is considered to be advantageous as, in combination with the lens structure 14, it provides the ability to provide multiple viewing positions.

The aperture barrier 26 can be considered to provide view position input sources 32 that are received by the lens structure 14 as corresponding lens structure inputs 34. The view position screen 16 provides the lens structure 14 with a view position configuration 36. The views screen 18 provides the lens structure 14 with a views configuration 38. The view position configuration 36 and the views configuration 38 are able to transmit light, that is received from the view position input sources 32 as corresponding lens structure inputs 34, as views 39 grouped in view positions 40.

Having now described the general operation of the display 10, the embodiment is now described in further detail. The view position screen 16 is able to provide diverging light to the views screen 18 where the diverging light corresponds with the view positions 40. The views screen 18 uses the received light to generate the views 39 at each view position 40.

More-particularly, the view position screen 16 comprises a series of convex portions 44 facing away from the pixel layer 20.

Notably in another embodiment the convex portion 44 faces towards the pixel layer. In such an embodiment the device still works. The portion forms a convex lens and the distance relationship is modified to take into account the changes in the position of the centre of the lens. Having the convex portion facing away from the pixel layer, is considered to possibly simplify the manufacturing process because it is easier to lay the flat back surface of the lenticular screen against the flat front surface of the aperture barrier. Furthermore such an arrangement will also facilitate the placing of the spacers between the lenticular screen and the aperture barrier. The convex portions 44 provide the lens structure 14 with the view position configuration 36. Each convex portion 44 of the view position screen 16, in the series, spans a single pixel source 22 to receive light from the view position input sources 32 as the corresponding lens structure inputs 34.

The views screen 18 comprises a series of convex portions 46 facing away from the pixel layer 20. The series of convex portions 46 provide the views configuration 38.

In this embodiment both the view position screen 16 and the views screen 18 include a corresponding planar surface 47 facing towards the pixel layer 20.

Each convex portion 44 of the view position screen 16 can be considered as providing a 'lenticle' (in the form of a convex segment). Similarly; each convex portion 46 of views screen 18 can be considered as providing a 'lenticle'. The sets of lenticles 48 from the first lenticular screen 16 (view position screen 16) sitting behind each of the lenticles 50 of the second lenticular screen (views screen 18) provide lenticular grouping of the first screen 16. Number n pixel sources behind a set of lenticles 48 provides n views.

Lights from the neighbouring pixels that have passed through the corresponding lenticular group of the first screen 16 will pass through the corresponding lenticle of the second lenticular screen 18 which further redirects the light beams towards the correct neighbouring viewing windows within each viewing position.

The spatial light modulator of a standard lenticular display works by the specific redirection of the light beams from the pixels sources on the focal plane of the lenticular sheet (as shown in FIG. 3). The spatial light modulator of a standard parallax display works by specific angular placement of the rays relative to the apertures or the slits.

The spatial light modulator 24 of the display 10, on the other hand, makes use of specific relationships between the aperture barrier 26 and the first lenticular sheet 16 as well as the relationship between the two lenticular sheets 16 and 18 themselves.

The three elements of the spatial light modulator namely: the aperture barrier 26, the first lenticular screen 16 and the second lenticular screen 18 are arranged in various positions and relationships as is described in further detail below.

Returning to FIG. 6, there is shown an exemplary illustration of the single aperture group 30 and a single lenticle 44 of the first screen 16, in which:
n=the number of views seen by each viewer or number of viewing windows per viewing position
N=numbers of viewers or number of viewing positions
$w_s$=slit width or aperture width
$w_a$=aperture pitch
$w_{ag}$=pitch of aperture group
$w_p$=pixel pitch
$w_1$=lenticular pitch of first screen
$w_2$=lenticular pitch of second screen The aperture barrier 26 has the following characteristics:

(i) $w_{ag} = w_p$ i.e. pitch of aperture group=pixel pitch (ii) $w_s$ = aperture width
$$= \frac{\text{pitch of aperture group}}{\text{total number of views for the display}} = \frac{w_{ag}}{nN}$$
$$= \frac{\text{pixel pitch}}{\text{total number of views for the display}} = \frac{w_p}{nN}$$
$$= \frac{\text{aperture pitch}}{\text{number of views per viewing position}} = \frac{w_a}{n}$$

(iii) $w_a$ = aperture pitch
$$= \frac{\text{pitch of aperture group}}{\text{number of viewing position}} = \frac{w_{ag}}{N}$$
$$= \frac{\text{pixel pitch}}{\text{number of viewing position}} = \frac{w_p}{N}$$

The aperture barrier 26 is placed approximately at the focal plane of the first lenticular screen so that lights from the view position input sources 32 can be captured, collimated and redirected by the first lenticular screen 16.

The first lenticular screen 16 has the following characteristics:

(i) $w_1 = w_p$

Where:
$w_1$=lenticular pitch of first screen
$w_p$=pixel pitch

Figure 7:
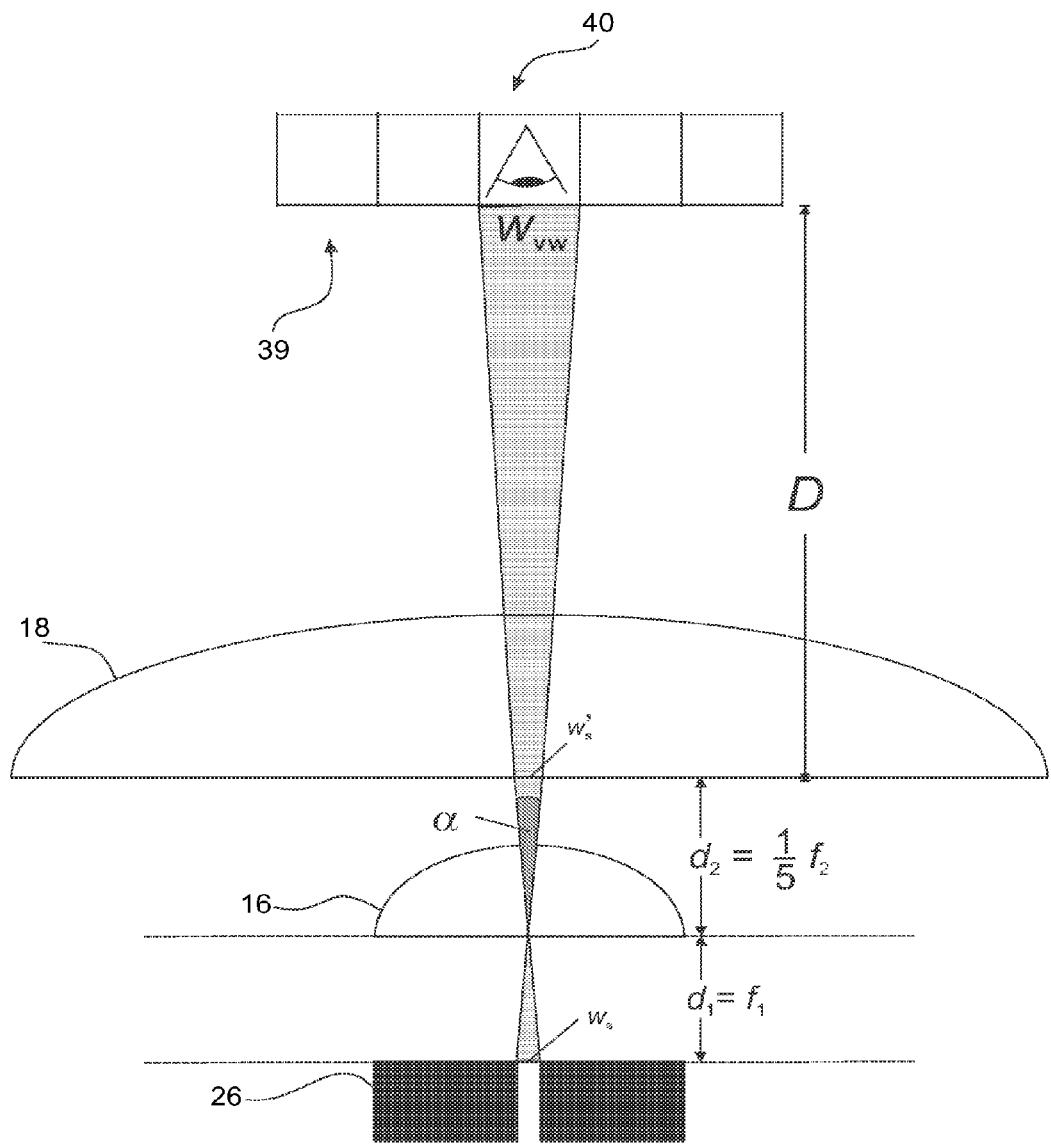
FIG. 7 provides an enlarged illustrative view of portions of an aperture barrier and lens structure of the display shown in FIG. 1.

Referring to FIG. 7, the first lenticular screen 16 defines:

(i) $d_1 = f_1$

Figure 8:
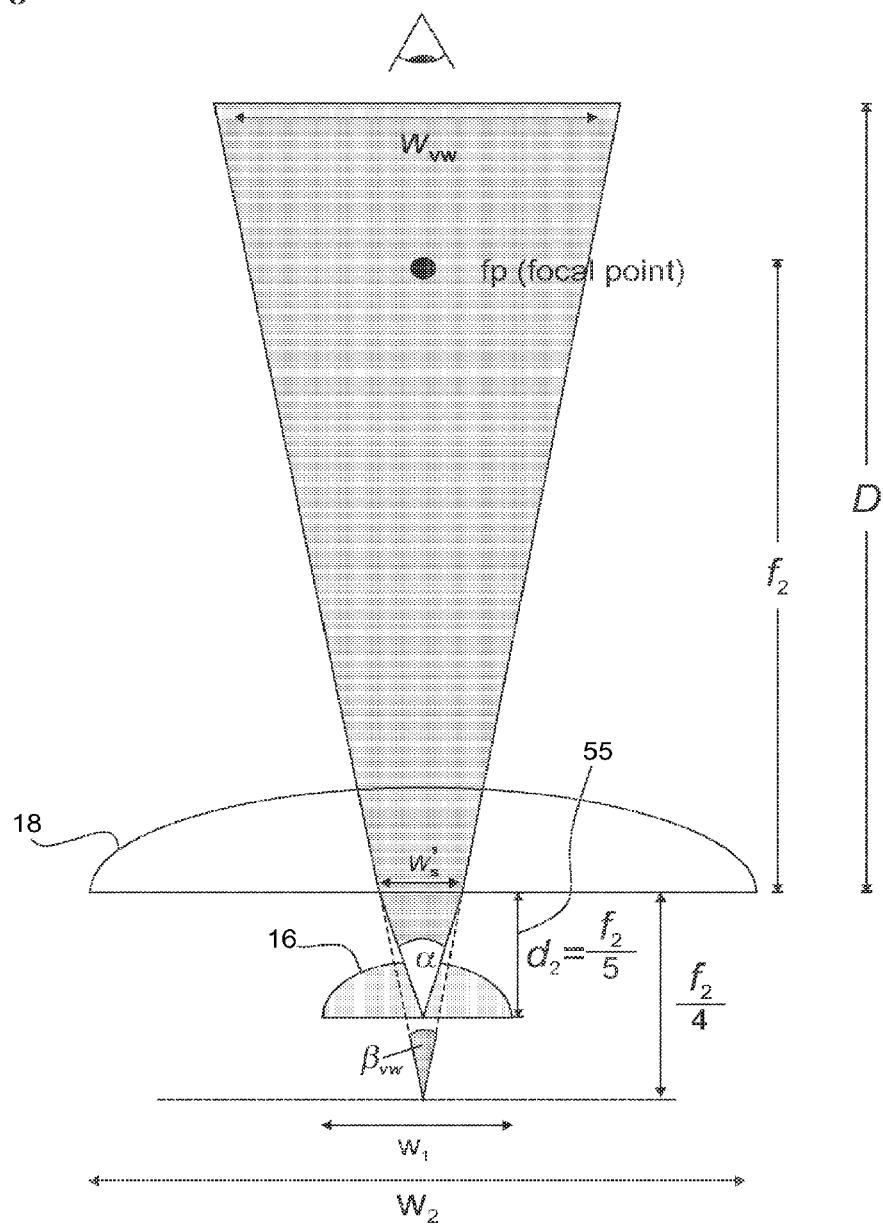
FIG. 8 provides another schematic view of the display shown in FIG. 1

Where:
$d_1$=barrier-lenticular distance
$f_1$=focal length of first lenticular screen The lenticular screen 16 normally collimates and redirects any diffracted light from a single point light source located on its focal plane. While the aperture barrier 26 is placed at the focal plane of the screen 16, the slit however is not a point source and it has a width $w_s$. Light from the slit will spread out from the first lenticular screen 16 due to diffraction and non-collimated nature of the backlight. The bundle of light exist from the convex surface 44 of each lenticle of the lenticular screen 16 is bounded by the two collimated beams originated from the left and right edges of the view position input sources 32. The angle between these two collimated beams, designated as α, is determined mainly by the barrier lenticular distance, the width of the slit and the relative position between the slit and the centre of the lenticle as illustrated in FIGS. 7 and 8. Of note, the value of this angle is independent of the degree of the spread of the non-collimated light at the exit of the view position input sources 32.

As shown in FIG. 5, on one level, the first lenticular screen 16 is responsible for redirecting light to all viewing positions 40 and the second lenticular screen 18 is responsible for redirecting lights to different views (viewing windows) within each viewing position.

The following relationship is defined between the two lenticular screens 16, 18:

$$\frac{f_2}{w_2} \geq N \frac{f_1}{w_1}$$

Where:
N=numbers of viewing positions or number of viewers
$f_1$=focal length of the first screen
$f_2$=focal length of the second screen
$w_1$=lenticular pitch of first screen
$w_2$=lenticular pitch of second screen The term $$\frac{f}{w}$$

is known as the f-number or the angular aperture of the lenticle. The above expression basically compares the powers of the two lenses. To demonstrate the concept, if we let the two lenticles having the same width w, then we have:

$$\frac{1}{f_1} \geq N \frac{1}{f_2}$$

This means that the power of the first lenticular screen is N times greater or equal to the power of the second screen. This relationship endeavors to ensure that beams designated for different viewing windows within each viewing position do not cross onto neighbouring viewing positions.

In the embodiment, the second lenticular screen 18 as illustrated in FIG. 7 and FIG. 8 has three main properties:
(i) As mentioned previously, the focal length of the second lenticular screen is determined by its relationship with the focal length of the first lenticular screen as well as the pitches of the two screens:

$$\frac{f_2}{w_2} \geq N \frac{f_1}{w_1}$$

(iv) The first lenticular screen 18 is placed inside the focal length of the second lenticular screen with the following relationship:

$$d_2 = \frac{1}{5}f_2$$

Where:
- $d_2$=distance between the two lenticular screens
- $f_2$=focal length of the second screen The second lenticular screen 18 collects, partially collimates and redirects the light beams from the first lenticular screen 16 towards the correct viewing windows 39 within each viewing position 40. While redirecting the light beams by the second lenticular screen 18 is a desirable property, the collimating effect is not. By placing the first lenticular screen 18 at a distance equal to ⅕ the focal length of the second screen 16, the result is a relatively good redirecting effect and with relatively low collimating effect.

The distance equal to ⅕ the focal length is considered to provide an advantageous result. The fraction ⅕ is chosen for the following reasons:
- It is smaller than the focal length $f_2$
- It simplifies the calculations of the width of viewing windows and viewing zone as well as the the viewing angles of the viewing windows and the display.
- Light sources from this distance suffer only a small amount of collimation and their lights are still directed by the lens in the correct directions.

In practice, the applicant considers that the value can be substituted with a number less than 1 as long as it satisfies the desired requirement of the viewing widths and the viewing distance of the display.

Advantageously, in this regard, the inter-lenticular distance 55 between the views screen 18 and the viewing position screen 16 (d2) can be increased or reduced to match the required viewing angle or viewing distance.

The pitch of second lenticular screen 18 (views screen) is slightly less than the pitch of the first lenticular screen 16 (view position screen 16) times the number of viewing windows per viewing position. This relationship can be expressed as:

$$w_2 \leq n \times w_1 \text{ or}$$

$$w_2 \leq n \times w_p$$

Where:
- n=numbers of viewing windows per viewing position
- $w_1$=lenticular pitch of first screen
- $w_2$=lenticular pitch of second screen
- $w_p$=pixel pitch This particular arrangement is used in larger displays to allow for view point correction. The lenticular elements of the second lens 18 can be slightly slanted with respect to the pixel columns to reduce the moire-like artefact. View point corrections are described briefly in U.S. Pat. No. 4,959,641 and in more details in Holliman, Nick. *3D Display Systems*. (1st ed. Durham: University of Durham, 2002. Web. 17 Jun. 2015).

As mentioned previously, the slit has a finite width $w_s$. Light from the slit spreads out as it heads towards the correct viewing windows as illustrated in FIGS. 7 and 8

Figure 9:
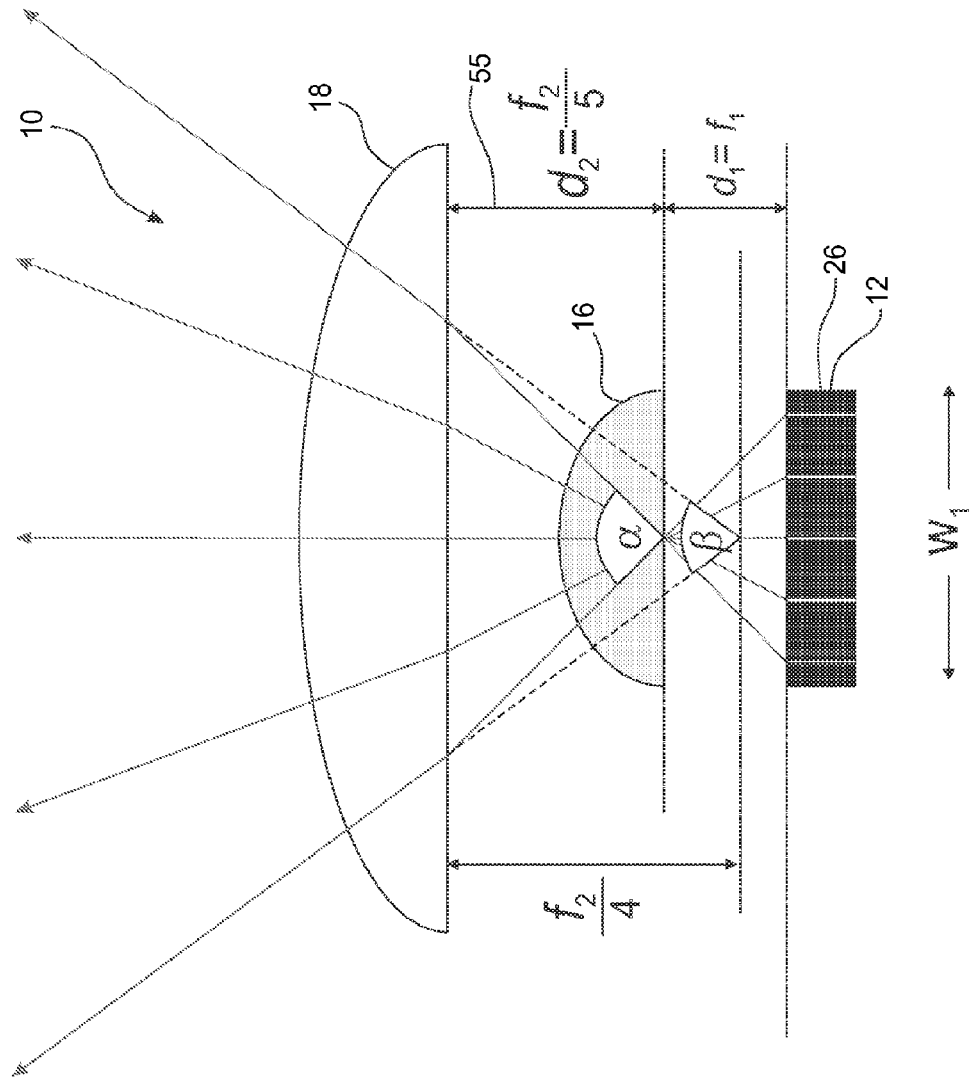
FIG. 9 provides a particularly exaggerated schematic view illustrating spread in the display shown in FIG. 1.

FIG. 9 is used to illustrate the viewing angle of the display. The picture in FIG. 9 is illustrative and not drawn to scale with the width slightly exaggerated to demonstrate the components.

The degree of spread or the width of the viewing window can be calculated using thin lens equation:

$$\frac{1}{o} + \frac{1}{i} = \frac{1}{f}$$

If the object distance $d_2$ is $f_2/5$, then the image distance will be $f_2/4$.

The width of the beam $w_s'$ on second lenticular screen will be:

$$w_s' = \frac{w_s}{d_1} \times d_2 = \frac{w_s \times \frac{f_2}{5}}{f_1}$$

Because D>>$f_2$, the width of viewing windows will be roughly equal to:

$$w_v = \frac{w_s'}{\text{image distance}} \times D = \frac{w_s \times \frac{f_2}{5}}{f_1} \times \frac{D}{\frac{f_2}{4}} = \frac{4}{5} \frac{w_s \times D}{f_1}$$

We can also estimate the value of the viewing angle of the viewing windows:

$$\beta_v = 2\left[\arctan\left(\frac{\frac{w_s'}{2}}{\text{image distance}}\right)\right] == 2\left[\arctan\left(\frac{\frac{w_s'}{2}}{\frac{f_2}{4}}\right)\right]$$

$$= 2\left\{\arctan\left[\frac{\left(w_s \times \frac{f_2}{5}\right)}{\frac{2f_1}{\frac{f_2}{4}}}\right]\right\}$$

$$= 2\left[\arctan\left(\frac{2}{5}\frac{w_s}{f_1}\right)\right]$$

Where:
- $\beta_{vw}$=viewing angle of the viewing window

Similarly, the viewing angle of the display as shown in FIG. 9 is:

$$\beta_D = 2\left[\arctan\left(\frac{2}{5}\frac{w_1}{f_1}\right)\right]$$

Where:
- $\beta_D$=viewing angle of the display.

Thus by varying $d_2$ or the distance 55 between the two lenticular screens, it is possible to match the parameters of the display against the required viewing angles, the width of the viewing zone or the viewing distance.

In the embodiment, the use of double lenticular screens is considered to allow for a much wider viewing angle $\beta_D$ for the display which in turn permits a larger number of viewers. The present embodiment is considered to provide a relatively wide viewing angle.

Notably the resolution is still dependent on the number stereoscopic viewing windows within each viewing position and, in this embodiment, view point correction techniques are not used.

Figure 10:
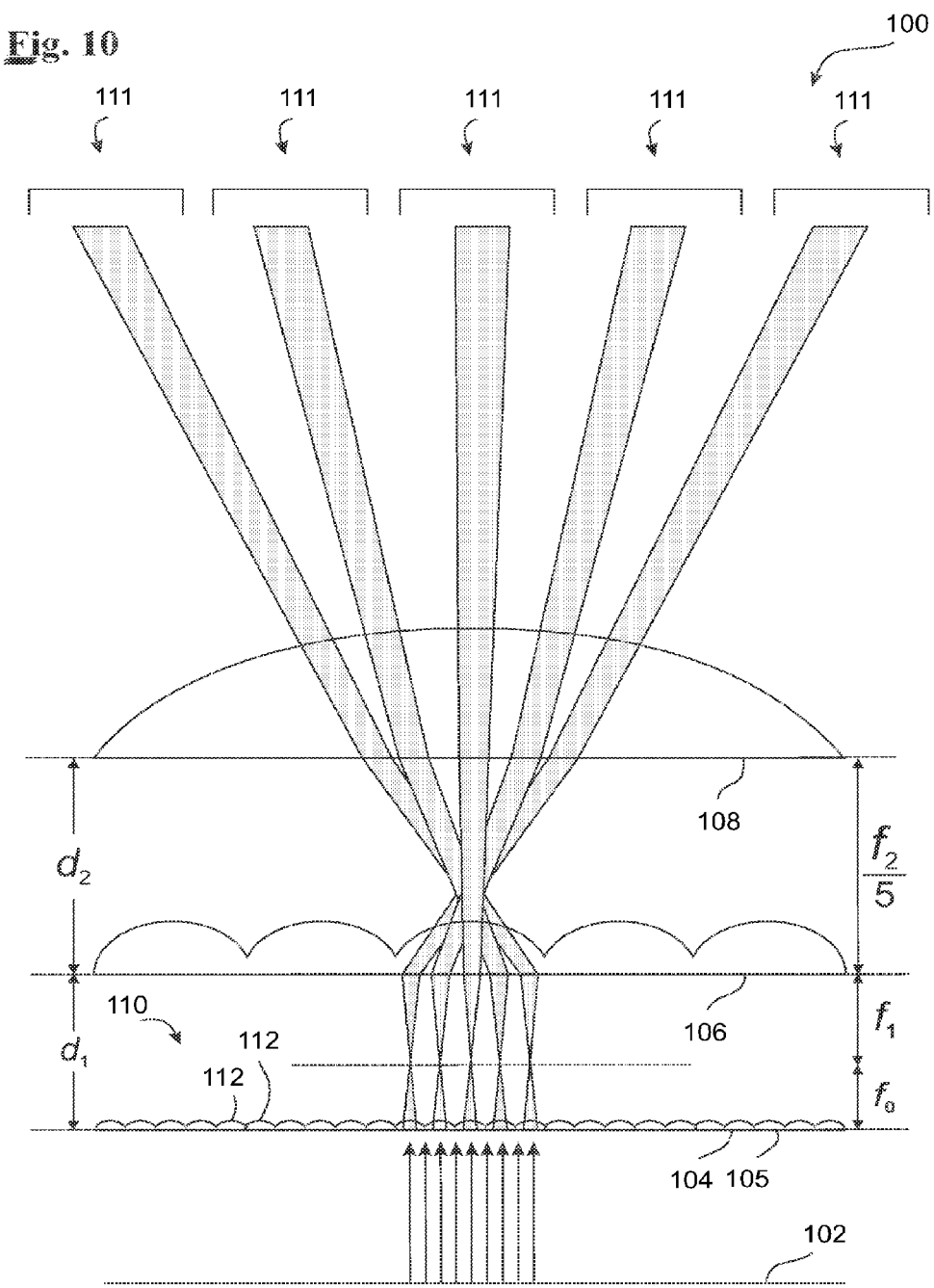
FIG. 10 provides a view of an auto stereoscopic display according to a second preferred embodiment of the present invention.
Figure 11:
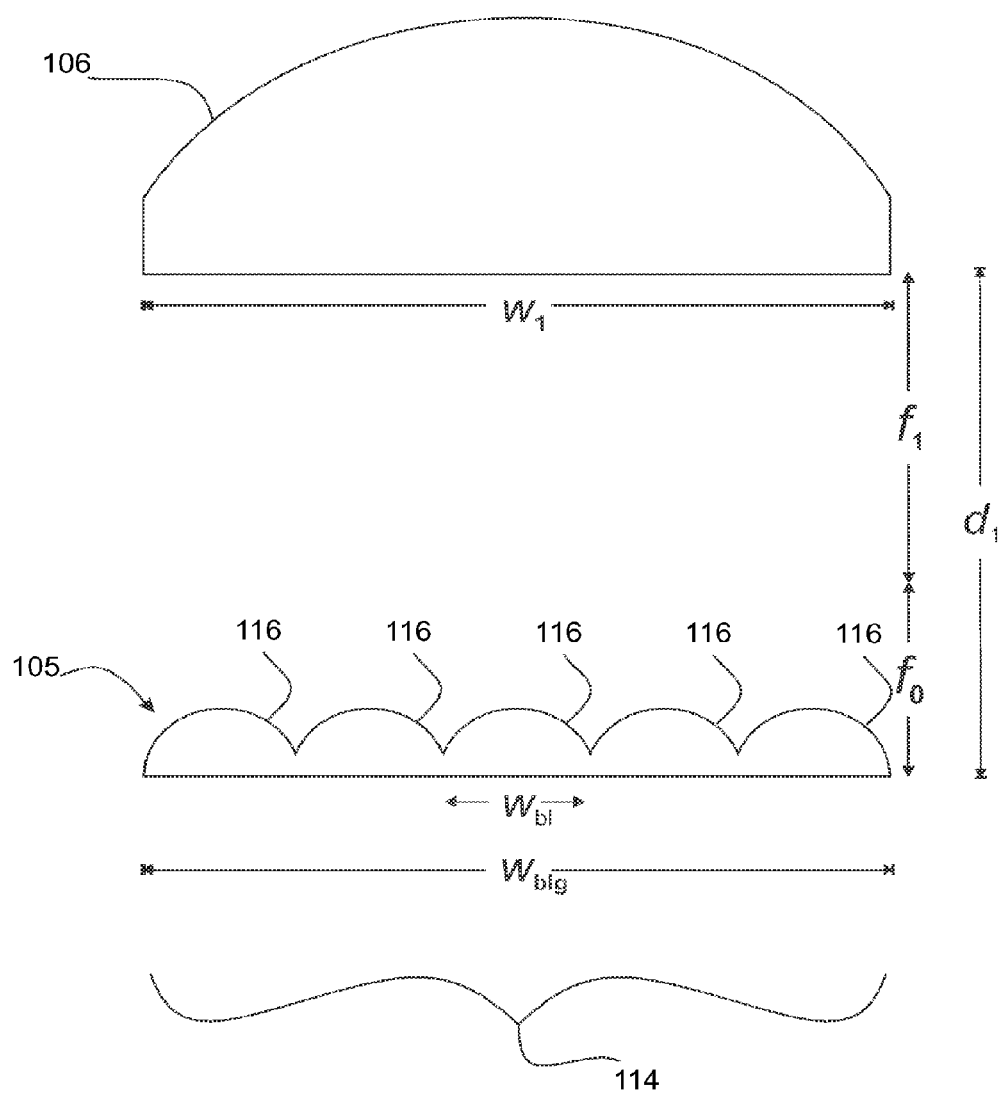
FIG. 11 provides an enlarged illustrative view of a segment of a barrier and lenticular convex element of the display shown in FIG. 10.

Referring to FIGS. 10 and 11, there is provided an autostereoscopic display 100 according to a second preferred embodiment of the present invention. The autostereoscopic display 100 comprises: a backlight source 102, a source screen 104; a view position screen 106; and a views screen 108. The view position screen 106 is provided in the form of a first lenticular screen. The views screen 108 is provided in the form of a second lenticular screen. Notably in FIG. 10 the width is exaggerated to demonstrate the components.

Advantageously the display 100 does not have an aperture barrier 26 that blocks out a significant portion of the light from the backlight source 102. Rather, the display 100 utilizes a barrier lenticular screen 105 that allows a significant proportion of light to pass therethrough providing a relatively high brightness display.

The source screen 104 provides the barrier lenticular screen 105 in the form of a series 110 of convex portions 112 facing away from the pixel layer (backlight source 102). The barrier lenticular screen 105 is used to divide light from the back light source 102 into individual beams after passing through the barrier lenticular screen 105. The beams are redirected by the first lenticular screen 106 towards the predetermined viewing positions 111. The beams are then further redirected by the second lenticular screen 108 towards the correct viewing windows within each viewing position 111.

The properties and functions of the first and second lenticular screens 106, 108 are the same as those in the first embodiment (display 10). The relationship:

$$\frac{f_2}{w_2} \geq N \frac{f_1}{w_1}$$

between the two lenses also remain.

The distance between the barrier lenticular screen and the first lenticular screen is given as:

$$d_1 = f_0 + f_1$$

Where:
- $d_1$ = distance between the first lenticular screen and the barrier lenticular screen
- $f_0$ = focal length of the barrier lenticular screen
- $f_1$ = focal length of the first lenticular screen In the embodiment, referring to FIG. 11, the barrier lenticular screen 105 will have the following properties:

$$w_{blg} = w_p = w_1 \quad (i)$$

where:
- $w_{blg}$ = pitch of barrier lenticular group

From the above equation we have:
- pitch of barrier lenticular group=pixel pitch=first lenticular pitch.

Each barrier lenticular grouping 114 is defined as the group of barrier lenticles 116 whose light is captured by a single lenticle of the first lenticular screen 106. Each group of barrier lenticles is shone by a single pixel and the group 114 generates separate light source inputs therefrom.

(ii) The barrier lenticular pitch or $w_{bl}$ is given as $$w_b = \frac{\text{pitch of barrier lenticular group}}{\text{number of viewing positions}} = \frac{w_b}{N}$$

$$= \frac{1st \text{ lenticular pitch}}{\text{number of viewing positions}} = \frac{w_1}{N}$$

$$= \frac{\text{pixel pitch}}{\text{number of viewing positions}} = \frac{w_P}{N}$$

As would be apparent, N (more than 2) convex portions 116 span each pixel to provide the lens arrangement with N viewing positions.

Each pixel will send light through one single barrier lenticular group where there are N number of lenticles per barrier lenticular group. Each lenticle of the group will send a single beam of light from the same pixel to a single viewing position. Each pixel sends its light to all the viewing positions through a single barrier lenticular group.

Figure 12:
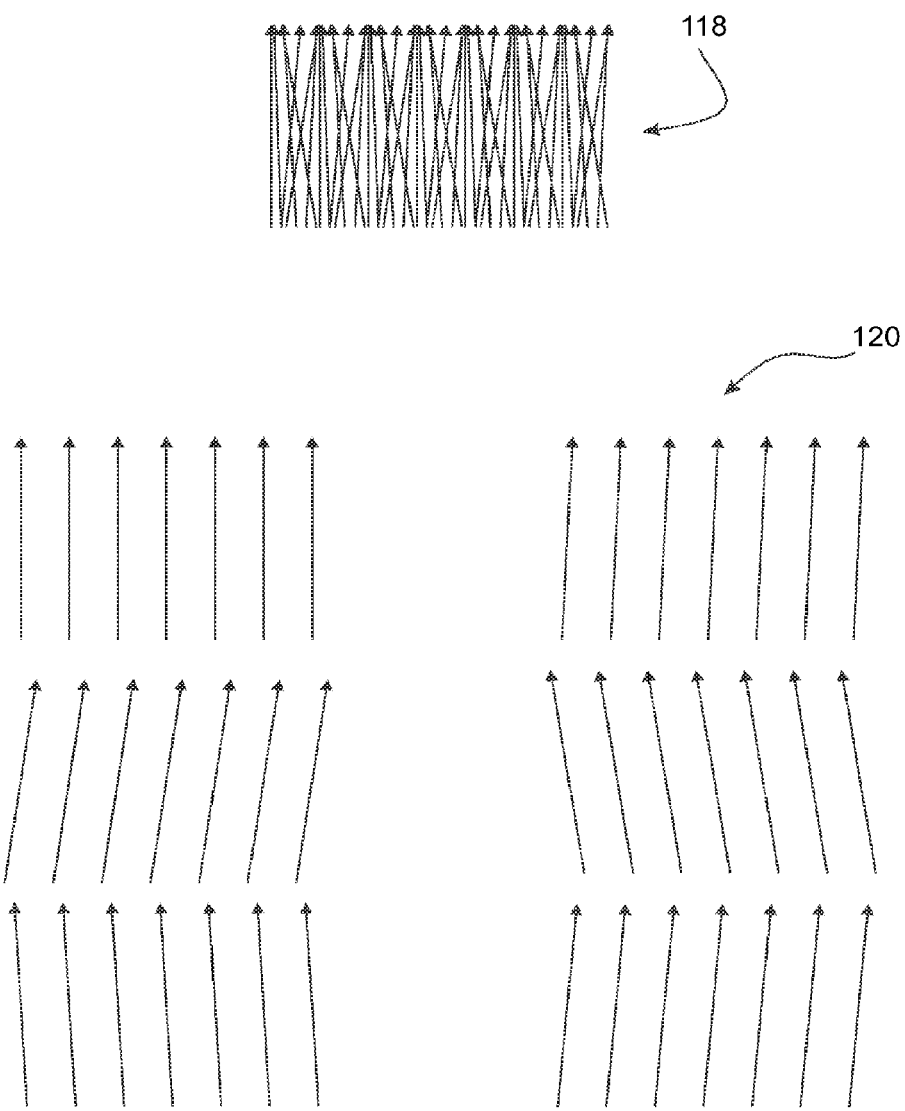
FIG. 12 provides an illustration of the possible makeup of apparently non-collimated light.
Figure 13:
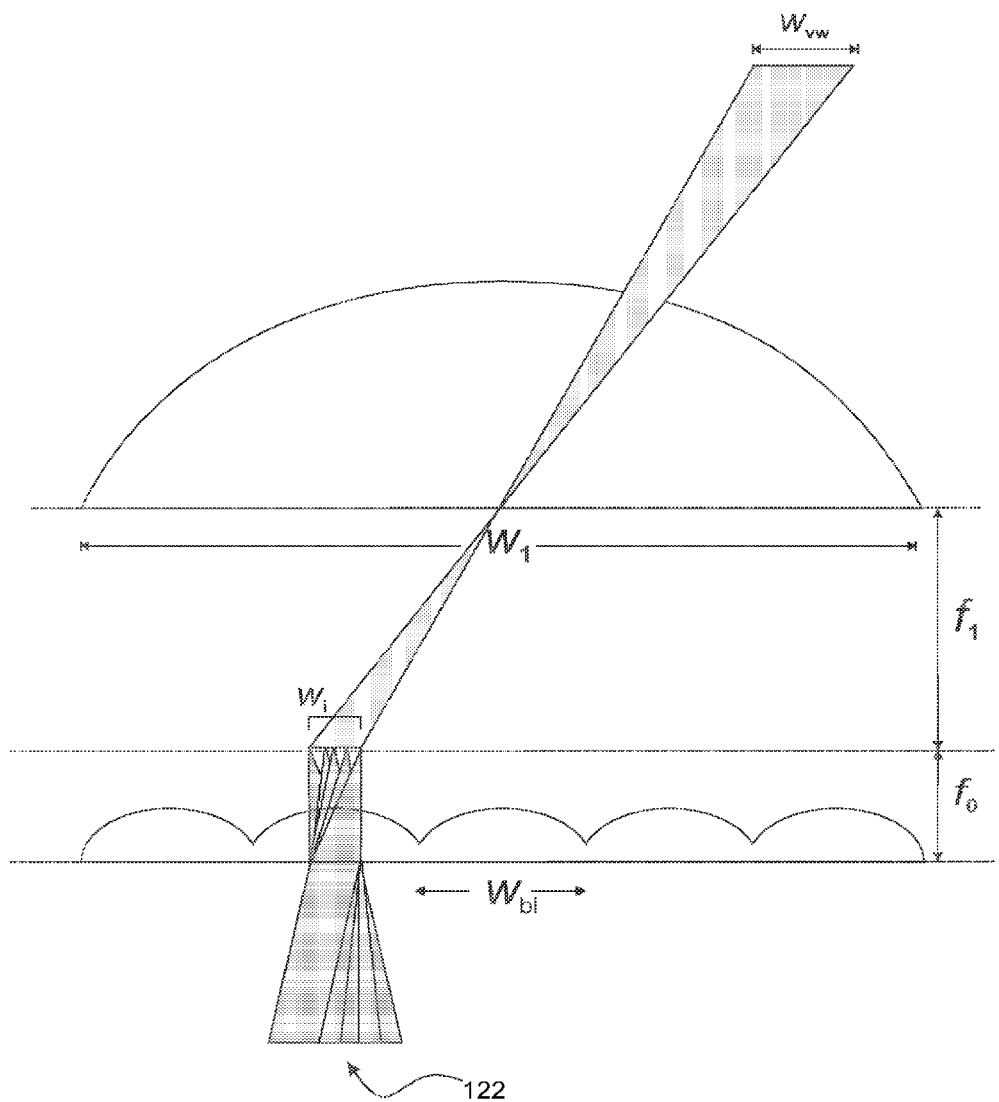
FIG. 13 provides an illustration of how diffused non-collimated light is handled in the display shown in FIG. 10.

Light from the back light source is normally not collimated and therefore not supposed to be focused onto a single point on the focal plane by a converging lens. As shown in FIG. 12, if we look more closely at a diffused non collimated light 118 it is composed of many smaller groups of lights 120. Lights from different groups do not collimate but within each group however lights are approximately collimated. Lights from each of these approximately collimated groups will be focussed by the converging lens onto a single point on the focal plane. Different groups of light have different focal points on the focal plane. As a consequence light from a diffused non collimated light source will not obey the thin lens equation as well as lights coming from a discreet light source. Rather the diffused lights tend to be focussed by a converging lens onto an area lying on the focal plane of the lens as shown in FIG. 13. If the beam subgroups of a combined beam travel in closely parallel directions, then the combined beam is said to be highly collimated. If the beam subgroups have widely divergent directions, then the combined beam is considered to be poorly collimated. Diffused non-collimated light is provided at 122.

The image lies on both focal planes of the barrier lenticular screen and the first lenticular screen. The width of the image, $w_i$, is the equivalent of the width of the slit, $w_s$. As a result, the width of the image, $w_i$, can be used to calculate the width of the viewing windows $w_{vw}$:

$$w_v = \frac{4}{5} \frac{w_i \times D}{f_1}$$

Or the viewing angle of the viewing windows $\beta_{vw}$:

$$\beta_v = 2\left[\arctan\left(\frac{2}{5}\frac{w_i}{f_1}\right)\right]$$

The viewing angle of the display $\beta_D$ remains unchanged as:

$$\beta_D = 2\left[\arctan\left(\frac{2}{5}\frac{w_1}{f_1}\right)\right]$$

In order for the width of the viewing windows $w_{vw}$ not to overlap each other within the viewing position, we need the width of the image $w_i$ to be:

$$w_i = \frac{\text{pitch of barrier lenticular group}}{\text{total number of views for the display}} = \frac{w_b}{nN}$$

-continued $$= \frac{1st\ \text{lenticular pitch}}{\text{total number of views for the display}} = \frac{w_1}{nN}$$

$$= \frac{\text{pixel pitch}}{\text{total number of views for the display}} = \frac{w_P}{nN}$$

$$= \frac{\text{barrier lenticular pitch}}{\text{number of views per viewing position}} = \frac{w_b}{n}$$

To facilitate the matching of the width of the image $w_i$ against the above requirements, it is desirable to have a mean to control the width of the image $w_i$. This can be achieved by manipulating the degree of collimation of the lights from the backlight source: a high degree of collimation will result in a narrow width of the image while a low degree of collimation will give a large width of the image. Most of the back light sources have a lightguide system and by varying the design of the light guide or even adding in a collimator component, it is possible to control the width of the image and the width of the viewing windows with a high degree of accuracy. Various backlighting and light collimation systems are possible.

Thus in the embodiment described each pixel will provide a single view to all the N viewing positions. In order to provide multiple numbers of views for each viewing position or n number of viewing windows we will provide n number of pixels. As a result the resolution of the display is inversely proportional to the number of views per viewing position or the n term but is independent of the number of viewing position or the N term. Notably, whilst not presently preferred, it is envisaged that the view position screen 106 and the views screen 108 could be combined into a single unitary lens.

Referring to FIG. 14 there is shown a method 150 according to a third preferred embodiment of the present invention. The method 150 provides autostereoscopic images 151. At block 152 the method 150 provides a source screen 154 to separate light from a number of pixel sources 156 into view position input sources 158 each corresponding with a different view position. At block 160 the method 150 includes transmitting the separated light 158 to a lens structure 162 having view position configuration 164 and an views configuration 166 The view position configuration 164 and the views configuration 166 transmit the light, that is received from the view position input sources 158 as corresponding lens structure inputs 168 (at the input of the lens structure 162), as views grouped in viewing positions for viewing at the viewing 170.

In the method 150, using the source screen 154 to separate the light from the pixel sources 156 includes using a series lenticels arranged one after the other as convex portions 172 facing away from the pixel layer to separate the light. A number N, more than 2, convex portions span each pixel to provide the lens arrangement with N viewing positions.

In the method 150, the lens structure 162 uses a view position screen 174 comprising a series of convex portions 176 facing away from the pixel layer to provide the view position configuration 164. Each convex portions 176 is grouped with N>1 convex portions 172 to provide N viewing positions.

At block 178, after using the view position screen 174, the method uses a views screen 179 comprising a series of convex portions 180 (only one being shown for simplicity) facing away from the pixel layer to provide the views configuration 166.

At block 178 the method 150 includes controlling the distance 182 between the view position screen 174 and the views screen 179 to match parameters for desired viewing angles, the width of the viewing zone or the viewing distance. The distance is used to assist with limiting the likelihood of overlap.

In the method 150 the distance between the view position screen 174 and the views screen 179 is initially set to a default equal to ⅓ the focal length of the views screen. The reason for this default position was described in relation to the display 10. Similar considerations apply with respect to the method 150.

The preferred embodiments of various systems and methods according to the present invention are considered to provide a number of advantages including:

(i) The provision of aperture slit and lenticular technology systems that provide a wide viewing angle for the display, a large number of viewing positions and which have a resolution largely independent of the number of viewing positions.

(ii) The provisions of lenticular technology systems having plano-convex lenticel sections that are readily fabricated using current technologies.

(iii) The provision of lenticular technology systems having plano-convex lenticel sections allowing for the formation of individual view position input sources from a light source (such as an led) where each view position input source corresponds with a different view position without substantial losses from the light source.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

Whilst a background to the invention has been provided, it is to be recognised that any discussion in the present specification is intended to explain the context of the present invention. It is not to be taken as an admission that the material discussed formed part of the prior art base or relevant general knowledge in any particular country or region

The invention claimed is:

1. A lens arrangement for a layer of pixels in an autostereoscopic display, the lens arrangement causing a single image to be projected to a plurality of viewing positions, the lens arrangement comprising:

a first screen disposed in front of the layer of pixels, the first screen having a plurality of groups of openings therethrough, each of the pixels aligned with one of the groups of openings;

a first plurality of lenticular lenses disposed in front of the first screen, each of the lenticular lenses in the first plurality of lenticular lenses receiving a plurality of light beams from each of the plurality of pixels that pass through the openings in the first screen; and a second plurality of lenticular lenses disposed in front of the first plurality of lenticular lenses, the second plurality being smaller in number than the first plurality of lenticular lenses, the first and second plurality of lenticular lenses causing the same image to be projected to a plurality of viewing positions, each of the plurality of viewing positions having the same image simultaneously.

2. The lens arrangement according to claim 1, wherein each of the groups of the openings receive a portion of the light from a single pixel in the layer of pixels.

3. The lens arrangement according to claim 1, wherein the first screen is an aperture barrier.

4. The lens arrangement according to claim 1, wherein each of the groups include a number N of openings, with N being greater than 2, to provide N different viewing positions for N viewers.

5. The lens arrangement according to claim 1, wherein the first plurality of lenticular lenses provides diverging light corresponding with the view positions to the second plurality of lenticular lenses, the second plurality of lenticular lenses using the light from the openings in the first screen to generate views at each viewing position.

6. The lens arrangement according to claim 1, wherein the first plurality of lenticular lenses and the second plurality of lenticular lenses are separated by a distance, the distance being varied to match parameters for required viewing angles, a width of a viewing zone, or a viewing distance.

7. The lens arrangement according to claim 6, wherein the second plurality of lenticular lenses have a focal length and the distance between the first plurality of lenticular lenses and the second plurality of lenticular lenses is less than the focal length of the second plurality of lenticular lenses.

8. The lens arrangement according to claim 1, wherein the first plurality of lenticular lenses comprises a series of convex portions facing away from the layer of pixels.

9. The lens arrangement according to claim 8, wherein each convex portion of first plurality of lenticular lenses spans a single pixel to receive light from the single pixel through the openings in the first screen.

10. The lens arrangement according to claim 1, wherein the second plurality of lenticular lenses comprises a series of convex portions facing away from the layer of pixels.

11. A method of providing autostereoscopic images, the method comprising:

providing a first screen disposed in front of a layer of pixels emanating light therefrom, each of the pixels aligned with a group of openings in the first screen to provide a number of light beams from each pixel;

providing a first plurality of lenticular lenses disposed in front of the first screen, each of the first plurality of lenticular lenses receiving the light beams from a single group of openings in the first screen;

providing a second plurality of lenticular lenses disposed in front of the first plurality of lenticular lenses, the second plurality of lenticular lenses being smaller than the first plurality of lenticular lenses, the first and second plurality of lenticular lenses causing an image to be projected to a plurality of viewing positions, each of the plurality of viewing positions having the same image simultaneously.

12. The method according to claim 11, wherein the number of light beams corresponds to the number of viewing positions.

13. The method according to claim 11, wherein the first screen is an aperture barrier.

14. The method according to claim 11, wherein each of the groups include a number N of openings, with N being greater than 2, to provide N different viewing positions for N viewers.

15. The method according to claim 11, wherein the first plurality of lenticular lenses provides diverging light corresponding with the view positions to the second plurality of lenticular lenses, the second plurality of lenticular lenses using the light from the first plurality of lenticular lenses to generate views at each viewing position.

16. The method according to claim 11, wherein the first plurality of lenticular lenses and the second plurality of lenticular lenses are separated by a distance, the distance being varied to match parameters for required viewing angles, a width of a viewing zone, or a viewing distance.

17. The method according to claim 11, wherein the second plurality of lenticular lenses have a focal length and the distance between the first plurality of lenticular lenses and the second plurality of lenticular lenses is less than the focal length of the second plurality of lenticular lenses.

18. The method according to claim 11, wherein the first plurality of lenticular lenses comprises a series of convex portions facing away from the layer of pixels.

19. The method according to claim 18, wherein each convex portion of first plurality of lenticular lenses spans a single pixel to receive light from the single pixel through one group of openings in the first screen.

20. The method according to claim 11, wherein the second plurality of lenticular lenses comprises a series of convex portions facing away from the layer of pixels.

* * * * *